Nov. 4, 1941.  A. N. PORTER  2,261,180
ROCKER BEARING
Filed Sept. 6, 1938  3 Sheets-Sheet 3
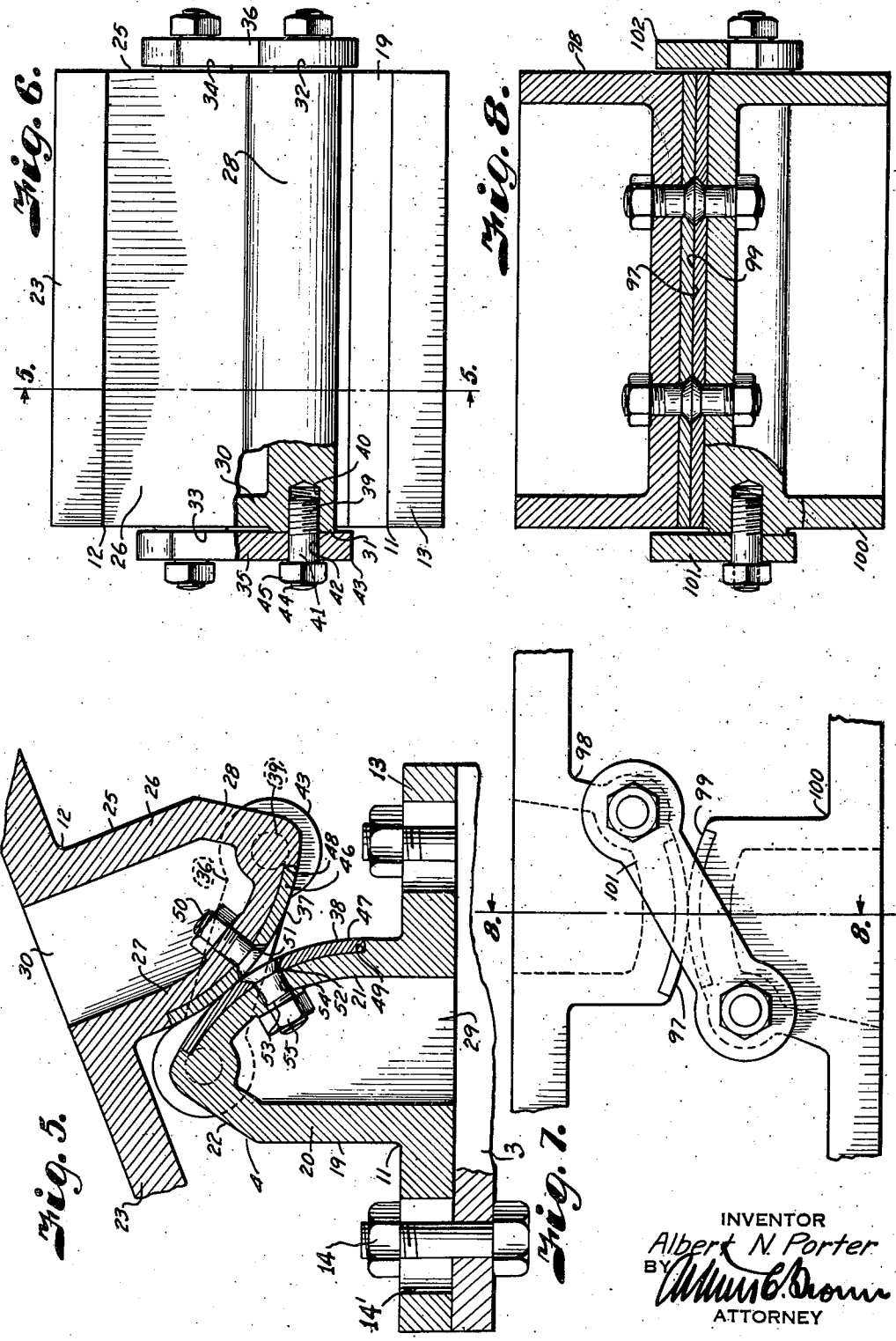

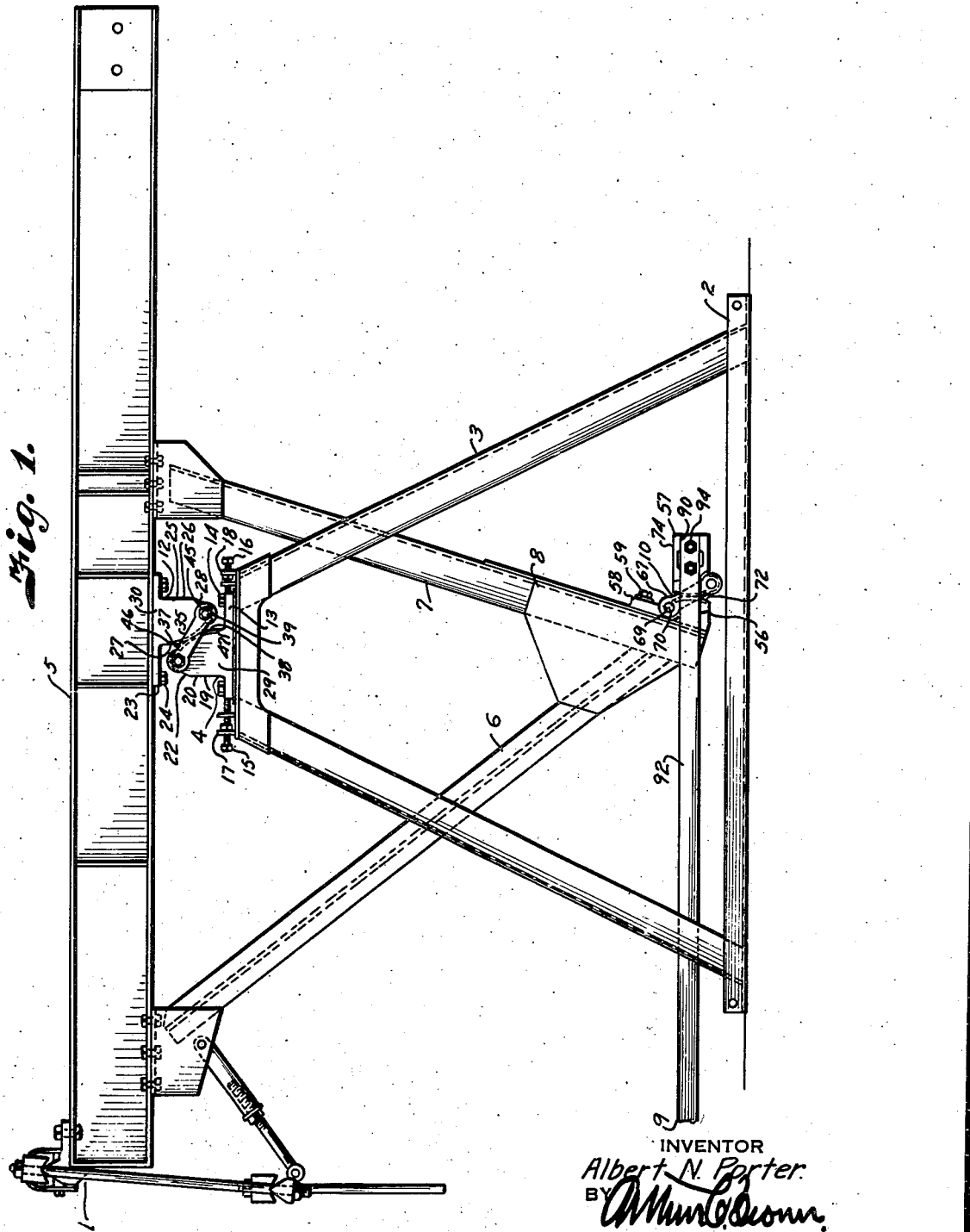

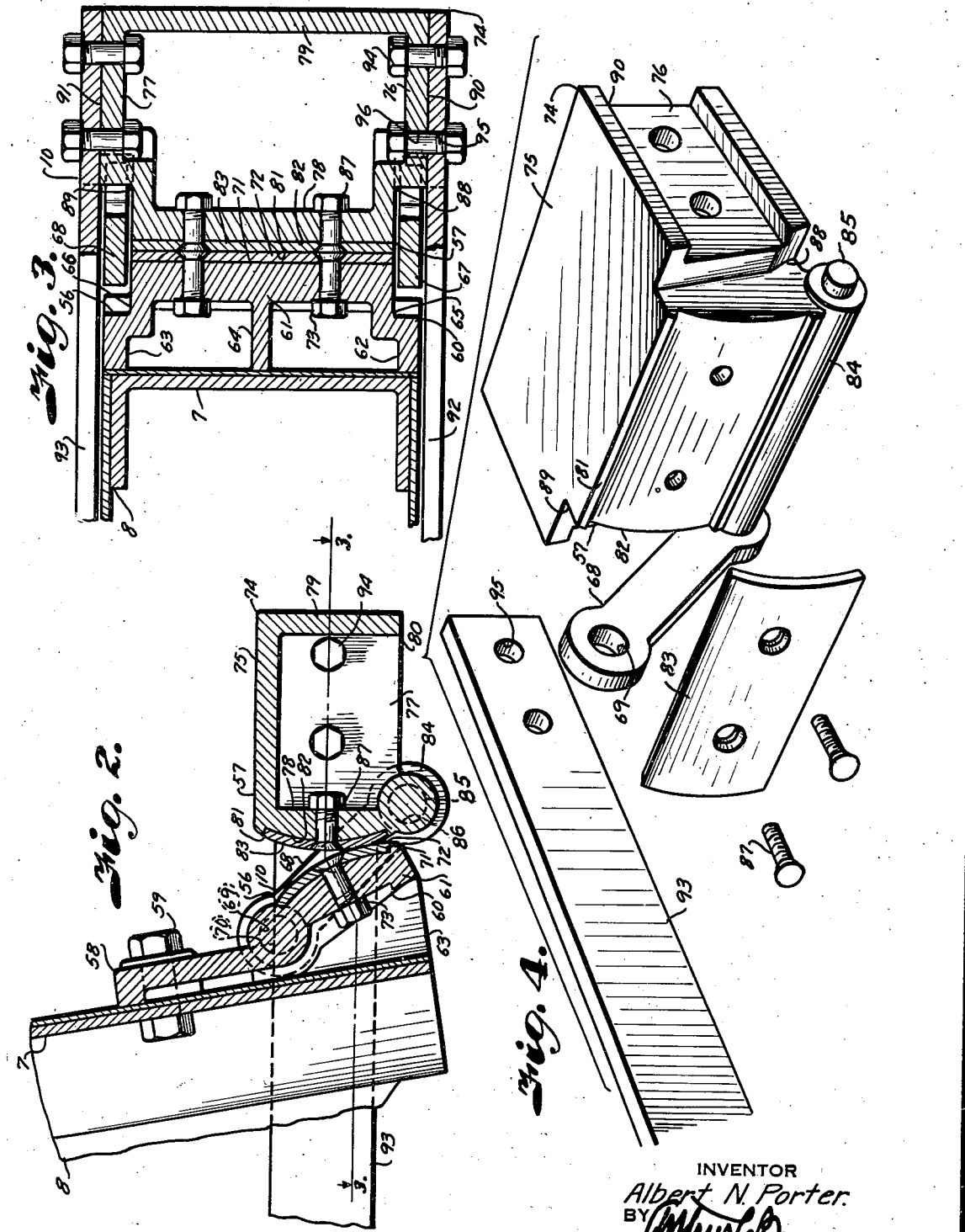

Patented Nov. 4, 1941

2,261,180

UNITED STATES PATENT OFFICE 2,261,180

ROCKER BEARING

Albert N. Porter, Tulsa, Okla., assignor to J. F. Darby, Tulsa, Okla.

Application September 6, 1938, Serial No. 228,488

6 Claims. (Cl. 308—21)

This invention relates to rocker bearings for pumping units such as used for lifting fluid from deep wells, and has for its principal object to provide a bearing of this character wherein the bearing surfaces have rolling or rocking contact relatively to each other, thereby reducing friction and obviating the necessity of lubrication.

Other objects of the invention are to provide bearings of this character constructed to withstand loads and thrusts to which they are subjected; to provide bearing members with removable rocking surfaces; and to provide a bearing with interconnecting links whereby the rocking surfaces are kept in contact.

In accomplishing these and other objects of the invention, as hereinafter pointed out, I have provided improved details of structure, the preferred forms of which are illustrated in the accompanying drawings, wherein:

Fig. 1 is a side elevational view of an under-pull pumping jack equipped with saddle and rocker arm bearings constructed in accordance with the present invention.

Fig. 2 is an enlarged longitudinal section through the rocker arm bearing particularly illustrating the rocking surfaces of the respective bearing members.

Fig. 3 is a section on the line 3—3 of Fig. 2.

Fig. 4 is a detail perspective view of the pull rod bearing member showing the insert in disassembled spaced relation together with one of the pull arms and a connecting link.

Fig. 5 is an enlarged detail vertical section through the saddle bearing on the line 5—5 of Fig. 6.

Fig. 6 is an end elevational view of the bearing, a part being broken away to illustrate attachment of the connecting links.

Fig. 7 is a side elevational view of a modified form of saddle bearing, particularly designed for use in connection with a pumping unit of the pitman actuated type.

Fig. 8 is a section through the modified form of saddle bearing on the line 8—8 of Fig. 7.

Referring more in detail to the drawings:

1 designates an under-pull pumping jack including a base 2 carrying a rocker beam supporting structure 3 on which is mounted a saddle bearing 4 for a rocker beam 5. Fixed to and depending from the rocker beam 5 on the respective sides of the saddle bearing are converging members 6 and 7 connected at their ends by a gusset structure 8 to form a substantially triangular shaped rocker arm that is connected with a pull rod 9 by a rocker arm bearing 10.

The saddle bearing 4, as well as the rocker arm bearing 10, is constructed in accordance with the present invention as now to be described.

The saddle bearing 4 comprises fixed and movable cooperating bearing members 11 and 12. The fixed member 11 includes a plate portion 13 that is mounted on the top of the supporting structure 3 and secured thereto by fastening devices, such as bolts 14, extending through slotted openings 14' in the plate portion and through aligning openings in the supporting structure whereby the bearing member may be adjusted to align the forward end of the rocker beam relatively to the axis of a well at which the pumping jack is located, the bearing member 11 being adjusted by manipulation of set screws 15 and 16 threaded in ears 17 and 18 on the supporting structure and having their shanks bearing against the front and rear edges of the plate portion 13.

Extending upwardly from the plate portion 13 is the body 19 of the bearing member 11, which is preferably hollowed to lighten the structure and form a substantially vertical front wall portion 20 and an upwardly and forwardly curved rear wall portion 21 interconnected therewith by an inwardly inclined wall 22 shaped to provide clearance for the movable bearing member 12.

The movable bearing member 12 conforms to the fixed bearing member 11 but is reversely arranged with respect thereto and includes a plate portion 23 that is attached to the rocker beam by fastening devices 24. The bearing member 12 also includes a hollow body 25 having a rear wall portion 26 and a curved front wall portion 27 connected therewith by an inclined portion 28. The ends of the bearing members are closed by end wall portions 29 and 30 respectively, having outwardly extending bosses 31—32 and 33—34 to attach connecting links 35 and 36 which retain the curved face 37 of the movable bearing member in rocking engagement with the curved face 38 of the fixed bearing member. The links are attached by studs 39 threaded into sockets 40 formed in the respective bosses and having shank portions 41 projecting through openings 42 in the ends 43 of the links and terminating in reduced threaded extensions 44 to mount retaining nuts 45.

The rocking surfaces of the respective bearing members are formed on the arcs of circles having diameters proportional to the length of the links and the pivotal connections of the links are located at opposite termini of the arcuate bearing surfaces so that one bearing surface may rock freely on the other without binding of the links and without slipping of the rocking surfaces relative to each other. In order to provide maximum rocking movement in effecting a long stroke for the pump rods, the ends of the rocking surfaces are relieved on arcs of shorter radius coinciding with the arcs of the central portions of the rocking surfaces. The rocking surfaces extend completely across the width of the body portions of the bearings and are preferably provided with inserts 46 and 47. The inserts consist of wear resisting plates having the shape of the bearing surfaces and are preferably inset into recesses 48 and 49 of the respective bearing members. The inserts are secured by fastening devices such as bolts 50 having heads 51 countersunk in openings 52 of the plates and threaded shanks 53 extending through aligning openings 54 in the curved walls of the bearing members to mount nuts 55 by which the plates are securely clamped within the recesses.

The rocker arm bearing includes cooperating bearing members 56 and 57. The member 56 comprises a plate portion 58 that is attached to the rear side of the rocker arm member 7 by fastening devices such as bolts 59 extending through suitable openings therein and through aligning openings in the arm. The rocker end of the plate portion terminates in a hollow body 60 formed by a rearwardly and downwardly curved wall portion 61 and end flanges 62 and 63 which engage against the rocker arm in cooperation with a central spacing flange 64. The ends of the curved wall portion are inset relatively to the end flanges to provide recesses 65 and 66 for accommodating connecting links 67 and 68 therein. The connecting links 67 and 68 have openings 69 in the ends thereof to engage over the trunnions 70 projecting laterally from the upper ends of the curved wall portions of the bearing member. The curved wall portion of the bearing member has a recess 71 in which is mounted an insert plate 72 secured by fastening devices 73 in the same manner as the inserts of the saddle bearing previously described.

The cooperating bearing member 57 includes a hollow body 74 formed by a top wall 75, end walls 76 and 77 and front and rear walls 78 and 79, leaving an open bottom side 80. The front wall 78 has a curved rocking face 81 provided with a recess 82 extending across the width thereof to mount an insert 83 corresponding to the insert 72. The lower edge of the front wall portion terminates in a cylindrical boss 84 having trunnions 85 projecting from the ends thereof to engage in openings 86 in the opposite ends of the links whereby the bearing member 57 is retained in rocking contact with respect to the bearing member 56. The insert 83 is secured by fastening devices 87 in the same manner as the cooperating insert previously referred to. The walls 76 and 77 project beyond the ends of the curved portion of the front wall to provide recesses 88 and 89 to cooperate with the recesses 65 and 66 in accommodating the connecting links. The end walls also have recesses 90 and 91 to mount the pull rod straps 92 and 93 that extend over the outer sides of the links and forwardly of the jack to connect with the pull rod 9, the pull rod bars being connected with the bearing member 57 by bolts 94 passing through openings 95 in the ends thereof and through aligning openings 96 in the bearing member, as clearly shown in Fig. 3. The rocking surfaces of the respective bearing members 56 and 57 are formed on arcs proportional to the length of the links so that the surfaces rock freely on each other without binding of the links, the bearing surfaces being formed on the arcs of circles in the same manner as described in connection with the saddle bearing.

The modification illustrated in Figs. 7 and 8 substantially conforms to that illustrated in Figs. 5 and 6 with the exception of the position of the rocking surfaces. In this instance the rocking surface 97 of the movable bearing member 98 is located directly over the rocking surface 99 of the fixed bearing member 100. This is because the resultant force of the thrust imparted by the pitman and rods acts substantially in a perpendicular direction.

In the under-pull type of pumping unit as shown in Fig. 1, the resultant force acts at an angle with respect to the perpendicular and consequently the rocking surfaces are arranged at an inclined angle as shown in Fig. 5. In other respects the saddle bearings are of substantially the same structure, the bearing members in the modified form being connectingly retained by links 101 and 102.

The operation of an under-pull pumping jack illustrated and described is as follows:

Reciprocatory motion is imparted to the pull rods for effecting rocking movement of the beam on its support. During reciprocation of the pull rods the convexly arranged arcuate surfaces of the respective bearing members 56 and 57 move in rocking contact with each other and therefore do not require the use of a lubricant. During rocking movement of the bearing members, the connecting links 67 and 68 swing about the axis of the trunnions 70 to allow freedom of movement of the bearing members and to retain one bearing member in cooperative relation with the other. Attention is directed to the fact that the thrusts acting on the bearing member maintain contact thereof during reciprocation of the beam so that there is little or no thrust applied to the connecting links. In fact, during operation the connecting links are free and may be moved freely on their trunnions. During rocking movement of the beam the bearing member 12 rocks upon the bearing member 4, the links 35 and 36 swinging about the axis of the studs 39 on the fixed bearing member 11. The thrusts of the bearing members are also such as to retain them in contact while the beam is in operation so that the links are substantially free and perform the office of retaining the bearing members in alignment when the beam is brought to rest.

From the foregoing it is obvious that I have provided a rocker bearing having rocking surfaces which eliminate the necessity of lubricant and the rocking surfaces thereof are retained in operative contact by connecting links that swing freely while the bearings are in operation.

What I claim and desire to secure by Letters Patent is:

1. A bearing for the rocker arm of an under-pull jack including a bearing member fixed to the rocker arm of the jack and having a convex substantially arcuate bearing surface, a cooperative bearing member having a similar bearing surface, links having the ends thereof pivotally connected with the respective bearing members to retain the bearing surfaces in contact with each other, and a pull rod connected with the cooperative bearing member and extending between the pivotal points at the respective ends of the links.

2. A bearing for the rocker arm of an under-pull jack including a bearing member fixed to the rocker arm of the jack and having a convex substantially arcuate bearing surface, a cooperative bearing member having a similar bearing surface, links pivotally connected with the respective bearing members to retain the bearing members in contact with each other, and pull rod bars connected with the cooperative bearing member and extending across said links to retain the links in connecting relation with said member.

3. A bearing including a bearing member having a convex bearing surface of arcuate cross-section, a cooperating bearing member having a reversely arranged bearing surface of similar cross-section and arranged to rock with said bearing surfaces in line contact in the direction of the axis of said rocking movement, and links having ends pivotally connected with one of the bearing members at one end of said arcuate surface and opposite ends pivoted at the opposite end of the arcuate surface of the other member to prevent sliding movement of one member relatively to the other.

4. A bearing including a bearing member having a convex bearing surface of arcuate cross-section, a cooperating bearing member having a reversely arranged bearing surface of similar cross-section and arranged to rock with said bearing surfaces in line contact in the direction of the axis of said rocking movement, and links pivotally connecting the bearing members and extending on chords with respect to said arcuate cross-sections for preventing sliding movement of one of said members with respect to the other in the arcuate directions of said cross-sections.

5. A bearing including a supported bearing member having a convex arcuate bearing surface with its axial center extending substantially parallel with the pivotal axis of the bearing, a complementary bearing member having a similar convex bearing surface in line contact with said surface of the other bearing member, links at the respective sides of the bearing members, means pivotally connecting one end of the links to the supported bearing member at a point above the axial center of the bearing surface thereof, and means pivotally connecting the opposite ends of the links with the complementary bearing member below the axial center of the arcuate bearing surface thereon whereby said complementary bearing member is suspendedly supported in rocking contact with the supported bearing member.

6. A bearing including a supported bearing member having a convex arcuate bearing surface with its axial center extending substantially parallel with the axis of the bearing, a complementary bearing member having a similar convex bearing surface in rocking contact with said surface of the other bearing member, means retaining said bearing members with the arcuate surfaces thereof in rocking contact including a link arranged substantially transversely of a plane extending through the axes of said arcuate bearing surfaces, means pivotally connecting one end of the link with the supported bearing member at one side of said plane, and means pivotally connecting the complementary bearing member with the other end of the link at the opposite side of said plane.

ALBERT N. PORTER.